US007983822B2

(12) United States Patent
Koski

(10) Patent No.: US 7,983,822 B2
(45) Date of Patent: Jul. 19, 2011

(54) DUAL WIRE INTERNAL MODE SWITCH ASSEMBLY

(75) Inventor: Jack P. Koski, South Lyon, MI (US)

(73) Assignee: GM Global Technology Operations LLC

( * ) Notice: Subject to any disclaimer, the term of this patent is extended or adjusted under 35 U.S.C. 154(b) by 1352 days.

(21) Appl. No.: 11/516,015

(22) Filed: Sep. 5, 2006

(65) Prior Publication Data

US 2008/0071448 A1 Mar. 20, 2008

(51) Int. Cl.
*G06F 7/00* (2006.01)

(52) U.S. Cl. .......... 701/51; 701/52; 701/63; 477/15

(58) Field of Classification Search .......... 701/51, 701/52, 62, 63, 64; 318/701; 477/15; 74/335
See application file for complete search history.

(56) References Cited

U.S. PATENT DOCUMENTS

| 4,747,056 | A  | * | 5/1988  | Yamamoto et al. ............ 701/63  |
| 4,896,135 | A  | * | 1/1990  | Deeds et al. ................. 340/456 |
| 5,949,344 | A  | * | 9/1999  | Yasuda et al. ............. 340/686.3 |
| 6,072,390 | A  | * | 6/2000  | Dourra et al. ................ 340/456 |
| 6,205,390 | B1 | * | 3/2001  | Holbrook et al. ............. 701/62  |
| 6,376,929 | B1 | * | 4/2002  | Nakajima .................... 307/10.1 |
| 7,084,597 | B2 | * | 8/2006  | Nakai et al. ................. 318/254.1|
| 7,139,652 | B2 | * | 11/2006 | Kikuchi ....................... 701/51  |
| 7,161,314 | B2 | * | 1/2007  | Nakai et al. ................. 318/400.4|
| 7,203,587 | B2 | * | 4/2007  | Tamaru et al. ................ 701/64  |
| 7,312,595 | B2 | * | 12/2007 | Kamio et al. ................. 318/701 |
| 7,552,615 | B2 | * | 6/2009  | Kuwata et al. ................ 73/1.75 |
| 7,584,681 | B2 | * | 9/2009  | Kozaki et al. ................. 74/335 |
| 7,609,012 | B2 | * | 10/2009 | Kamio et al. ................. 318/266 |
| 7,667,427 | B2 | * | 2/2010  | Kamio et al. ................. 318/701 |
| 2002/0019287 | A1 | * | 2/2002 | Ebashi et al. ................ 475/254 |
| 2002/0108457 | A1 | * | 8/2002 | Berger et al. ................. 74/335 |
| 2003/0222617 | A1 | * | 12/2003| Nakai et al. ................. 318/701 |
| 2004/0008002 | A1 | * | 1/2004 | Kamio et al. ................. 318/701 |
| 2004/0216549 | A1 | * | 11/2004| Shiomi et al. ................ 74/473.12|
| 2005/0000268 | A1 | * | 1/2005 | Kuwata et al. ................ 73/1.75 |
| 2005/0156550 | A1 | * | 7/2005 | Kamio et al. ................. 318/445 |
| 2006/0033464 | A1 | * | 2/2006 | Nakai et al. ................. 318/701 |
| 2006/0108966 | A1 | * | 5/2006 | Kamio et al. ................. 318/701 |
| 2006/0197489 | A1 | * | 9/2006 | Nakai et al. ................. 318/701 |
| 2006/0207310 | A1 | * | 9/2006 | Kuwata et al. ................ 73/1.37 |
| 2006/0283276 | A1 | * | 12/2006| Komatsu et al. ............... 74/335 |
| 2007/0182353 | A1 | * | 8/2007 | Kamio et al. ................. 318/466 |
| 2008/0210033 | A1 | * | 9/2008 | Amamiya et al. .............. 74/335 |
| 2008/0276738 | A1 | * | 11/2008| Kozaki et al. ................. 74/335 |
| 2009/0193923 | A1 | * | 8/2009 | Nakai et al. ................. 74/473.12|

FOREIGN PATENT DOCUMENTS

| DE | 10227633    | 1/2004  |
| DE | 102005041324| 3/2007  |
| EP | 065707      | 12/1995 |

* cited by examiner

*Primary Examiner* — Mark Hellner
*Assistant Examiner* — Helal A Algahaim

(57) ABSTRACT

A range selection system for a vehicle including an automatic transmission and an internal mode switch (IMS) assembly. The range selection system includes a housing that is rotatable around a core, a first set of switches that induce a first current based on a rotational position of the housing and a second set of switches that induce a second current based on a rotational position of the housing. A control module determines first and second voltages based on the first and second currents, respectively and determines a range of the automatic transmission based on the first and second voltages.

12 Claims, 9 Drawing Sheets

DUAL WIRE INTERNAL MODE SWITCH ASSEMBLY

FIELD

The present disclosure relates to vehicle control systems, and more particularly to an internal mode switch assembly.

BACKGROUND

The statements in this section merely provide background information related to the present disclosure and may not constitute prior art.

An internal mode switch (IMS) is a component of a transmission used to relay the driver's selected range intent to a control system of a vehicle. The conventional IMS assembly, used in vehicles including an automatic transmission, is a mechanical contact configuration. More specifically, the IMS assembly is a sliding contact electrical switch attached to a lower control valve body of the transmission. Conventional switches consist of two major components: a housing, which houses tracks of conductive and non-conductive material that make up stationary contacts, and an insulator assembly, which makes up the moving contacts and is linked to an operator controlled shift lever.

Referring now to FIG. 1, six tracks (A, B, C, Parity, Start, Ground) are shown according to a prior art IMS assembly. The moving contacts pass over tracks that consist of conductive sections (shaded) interrupted by non-conductive sections. For each driving range selected, the moving contacts are in contact with a unique pattern of conductive and non-conductive sections.

When a range is selected, the moving contacts align with conductive and non-conductive sections on the tracks. The IMS assembly independently outputs a signal (usually via wire) for each track to a control system. The signals read by the control system are either a high voltage signal or a low voltage signal. More specifically, the high voltage signal occurs when the moving contact is in contact with a non-conducting material, and the low voltage signal occurs when the moving contact is in contact with a conducting material. The signals produce a unique bit pattern which indicates the selected transmission range.

When using the conventional IMS assembly, fault conditions may not be distinguishable because the signals read by the control system are either a low voltage signal (e.g., 0 volts) or a high voltage signal (e.g., ignition voltage). This may lead to an undesired range indication, which may lead to an undesirable operating condition.

Since the IMS assembly is based on a mechanical configuration, the moving contacts are held against their respective tracks by springs. Due to vehicle motion and/or rough road conditions, the moving contacts may temporarily loose contact with its respective track. This situation is referred to as contact bounce. The control software must account for any contact bounce to ensure a true signal which may result in a time delay when selecting a transmission range. Additionally, mechanical wear and electrical corrosion between the contacts occur. Therefore, each wire outputting a high/low signal includes potential for electrical fault and has material and labor cost associated with it.

SUMMARY

Accordingly, the present invention provides a range selection system for a vehicle including an automatic transmission including an internal mode switch (IMS) assembly. The range selection system includes a housing that is rotatable around a core, a first set of switches that induce a first current based on a rotational position of the housing and a second set of switches that induce a second current based on a rotational position of the housing. A control module determines first and second voltages based on the first and second currents, respectively and indicates a range of the automatic transmission based on the first and second voltages.

In one feature, the first and second sets of switches are connected in parallel.

In another feature, the first and second sets of switches comprise Hall-effect switches.

In another feature, each of the switches of the first and second sets of switches induces one of a high current and a low current based on a rotational position of the housing.

In other features, the range selection system further includes a plurality of ferrous tracks embedded in the housing. Each of a plurality of rotational positions of the housing includes a unique alignment of at least a portion of the plurality of ferrous tracks with at least a portion of the switches of the first and second plurality of switches. A particular switch of the first and second sets of switches induces a high current when aligned with one of the plurality of ferrous tracks and induces a low current when not aligned with one of the plurality of ferrous tracks. The high and low currents corresponding to the first set of switches are different than the high and low currents corresponding to the second set of switches. In an alternative configuration, a particular switch of the first and second sets of switches induces a low current when aligned with one of the plurality of ferrous tracks and induces a high current when not aligned with one of the plurality of ferrous tracks.

In other features, the range selection system further includes a voltage source, a first resistor and a second resistor. The first resistor is in electrical communication with the voltage source and the first set of switches and the second resistor is in electrical communication with the voltage source and the second set of switches. The first voltage is determined as a first voltage drop across the first resistor and the second voltage is determine as a second voltage drop across the second resistor.

In still another feature, the control module identifies a fault when at least one of the first and second voltages is equal to zero.

In yet another feature, the control module identifies a fault when at least one of the first and second voltages is equal to a voltage of a voltage source that is in electrical communication with each of the first and second sets of switches.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
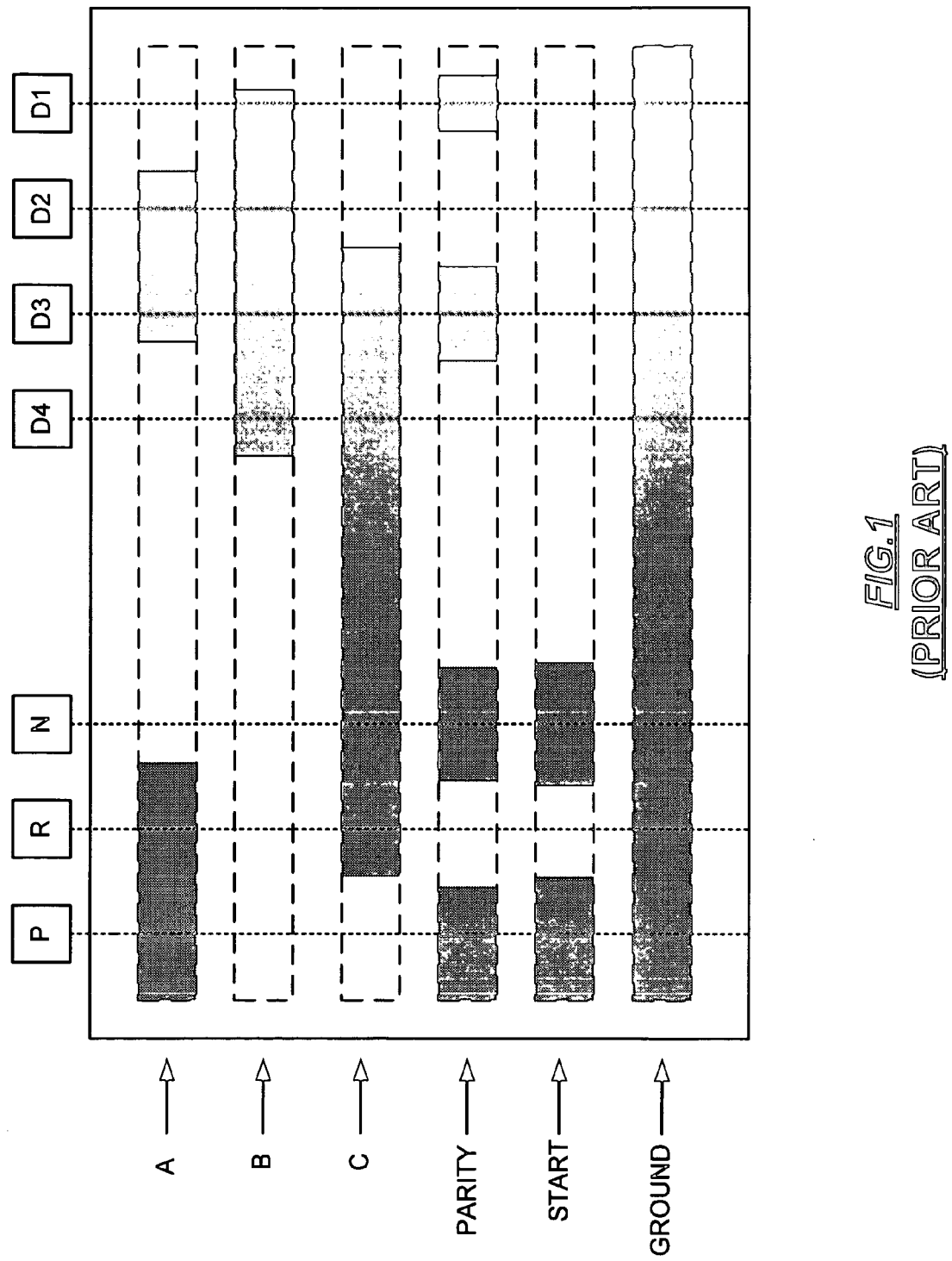
FIG. 1 is a schematic illustration of a prior art internal mode switch (IMS) assembly track pattern.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The dual wire internal mode switch (IMS) assembly according to the present disclosure reduces the hardware requirements as compared to a conventional IMS assembly. More specifically, the dual wire IMS assembly reduces the number of circuits by combing individual track circuits. This reduces the number of wires from five or more down to as few as two. The reduction in wires provides increased savings in material costs. Furthermore, the dual wire IMS assembly enables the control system to determine whether a fault (e.g., open/short circuit) has occurred.

Additionally, the IMS assembly according to the present disclosure uses Hall-effect switches to eliminate the mechanical contact configuration. In this manner, contact bounce is eliminated, and wear of mechanical components and erosion of electrical components are reduced.

Figure 2:
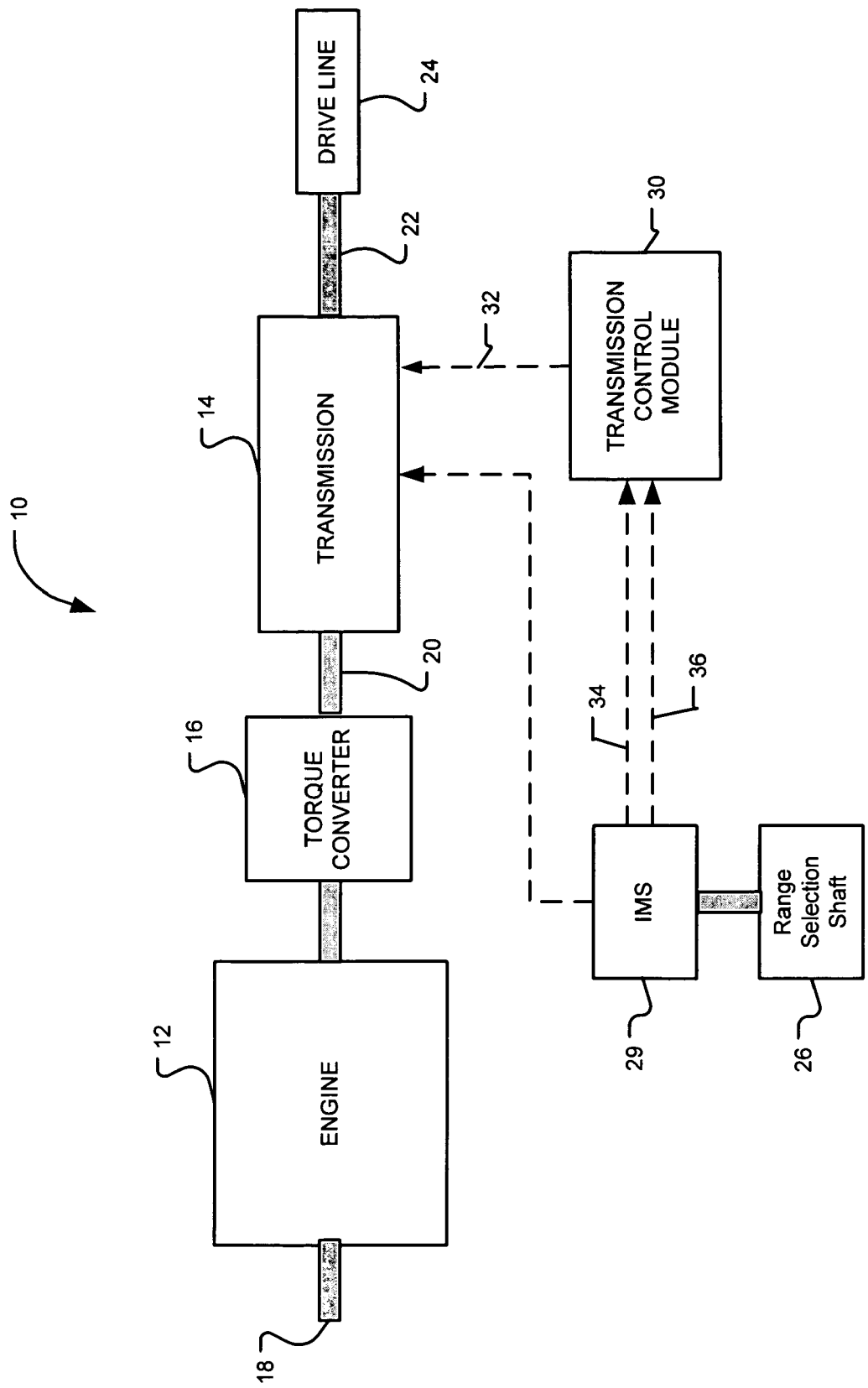
FIG. 2 is a functional block diagram of a vehicle including an automatic transmission and an IMS assembly according to the present disclosure.

Referring now to FIG. 2, a vehicle 10 is generally shown. The vehicle 10 includes an engine 12 that drives a transmission 14 through a torque converter 16. Air is drawn into the engine 12 through a throttle 18. The air is mixed with fuel and combusted within cylinders (not shown) of the engine 12 to produce drive torque. The torque converter 16 supplies the engine torque to the transmission via an input shaft 20. The transmission 14 in the exemplary embodiment is an automatic transmission that drives an output shaft 22 based on engine torque. The output shaft 22 drives a driveline 24 of the vehicle 10.

A range selection shaft 26 enables an operator to set the transmission 14 at a desired operating range including, but is not limited to, park, reverse, neutral, and one or more forward drive positions. The range selection shaft 26 enables a vehicle operator to select a desired transmission range. The transmission 14 includes an IMS 29. The transmission 14 may include a transmission control module 30 or may be separate from a transmission control module 30. The IMS 29 induces two currents based on the selected range. The transmission control module (TCM) 30 identifies the selected range based on the induced currents by the IMS 29. A first connecting conductor 34 and a second connecting conductor 36 each transmit signals in order for the TCM 30 to identify the selected range. The term conductor may include and is not limited to, wire, lead, and/or line.

Figure 3A:
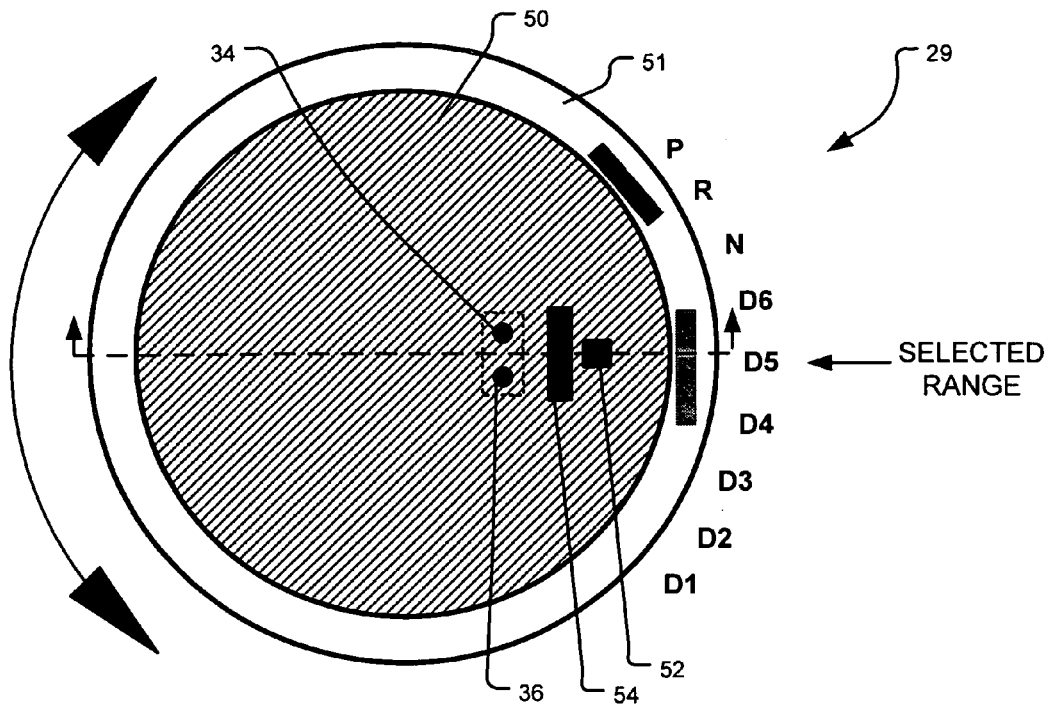
FIG. 3A is a cross-sectional view of an IMS in a first selected range.
Figure 3B:
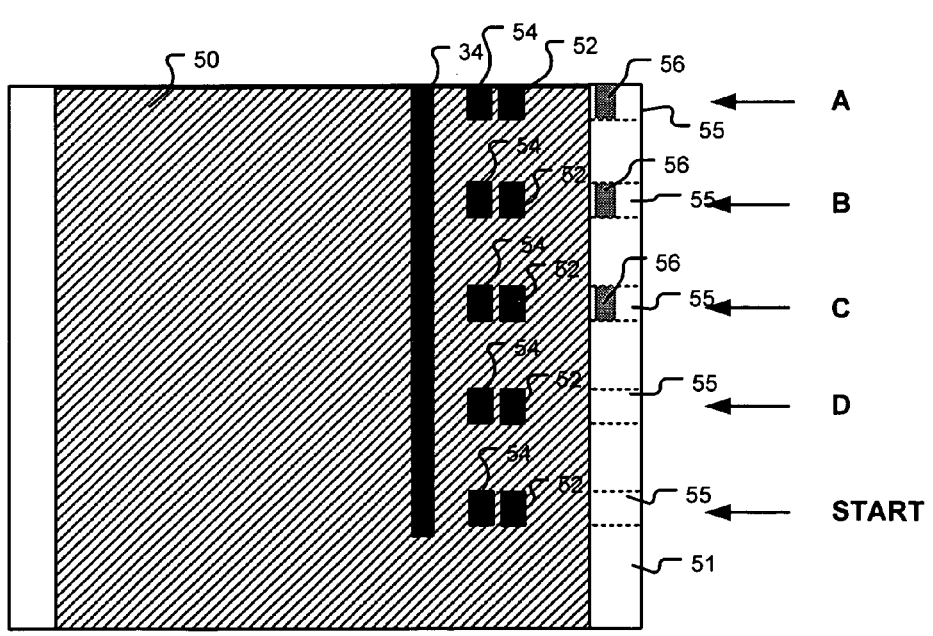
FIG. 3B is an alternate cross-sectional view of an IMS in the first selected range.

Referring now to FIGS. 3A and FIG. 3B, alternate cross-sectional views of an exemplary IMS 29 according to the present disclosure is shown in a first selected range (D5). The IMS 29 includes a core 50 and a track housing 51. The core 50 is made of a non-conducting material. Furthermore, the core 50 includes a plurality of Hall-effect switches 52, a plurality of back-bias magnets 54, and the first and second connecting conductors 34, 36 respectively. The back-bias magnets 54 are placed directly behind and inline with the Hall-effect switches 52. The driver selection shaft 26 rotates the track housing 51, which includes a plurality of tracks 55 labeled as A, B, C, D, START for exemplary purposes. Each of the Hall-effect switches 52 and the back-bias magnets 54 correspond to each one of the tracks 55. The track housing 51 may include any number of tracks 55. The tracks 55 include sections of the ferrous material 56 interrupted by sections of an absence of the ferrous material 56. The tracks 55 are described in further detail in conjunction with FIG. 5.

The Hall-effect switches 52 are based on the Hall-effect principle that is known to one skilled in the art. The Hall-effect switches 52 are designed to induce a constant high current or a constant low current. More specifically, when one of the tracks 55 is aligned in which one of the plurality of Hall-effect switches 52 and one of the back-bias magnets 54 are in the presence of the ferrous material 56 (track A), the Hall-effect switch 52 induces a high current. Conversely, when one of the tracks 55 is aligned in which one of the plurality of Hall-effect switches 52 and one of the back-bias magnets 54 are not in the presence of the ferrous material 56 (track D), the Hall-effect switch 52 induces a low current.

For example, in FIGS. 3A and 3B, the selected range is D5. The selected range has three of the tracks 55 (A,B,C) in which the corresponding Hall-effect switches 52 are in the presence of the ferrous material 56 and will induce a high current. The selected range also has two of the tracks 55 (D,START) in which the corresponding Hall-effect switches are not in the presence of the ferrous material 56 and will induce a low current.

Figure 4A:
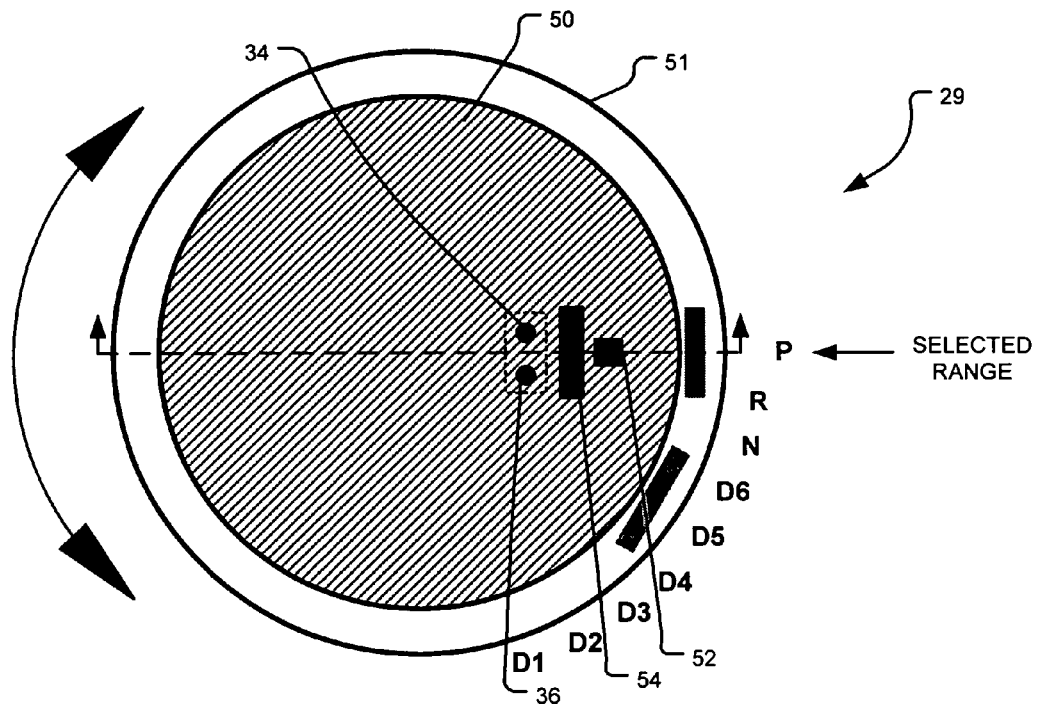
FIG. 4A is a cross-sectional view of an IMS in a second selected range.
Figure 4B:
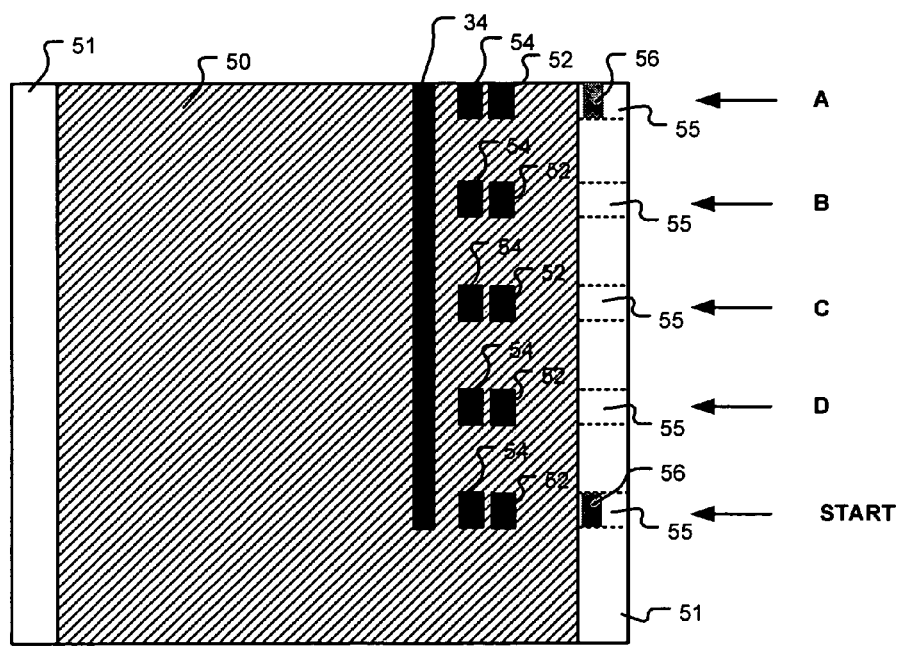
FIG. 4B is an alternate cross-sectional view of an IMS in the second selected range.

Referring now to FIGS. 4A and 4B, alternate cross-sectional views of the exemplary IMS 29 are shown in a second selected range (P). The selected range has two of the tracks 55 (A, START) in which the corresponding Hall-effect switches 52 are in the presence of the ferrous material 56, and will induce a high current. The selected range also has three of the tracks 55 (B, C, D) in which the corresponding Hall-effect switches 52 are not in the presence of the ferrous material 56 and will induce a low current.

Figure 5:
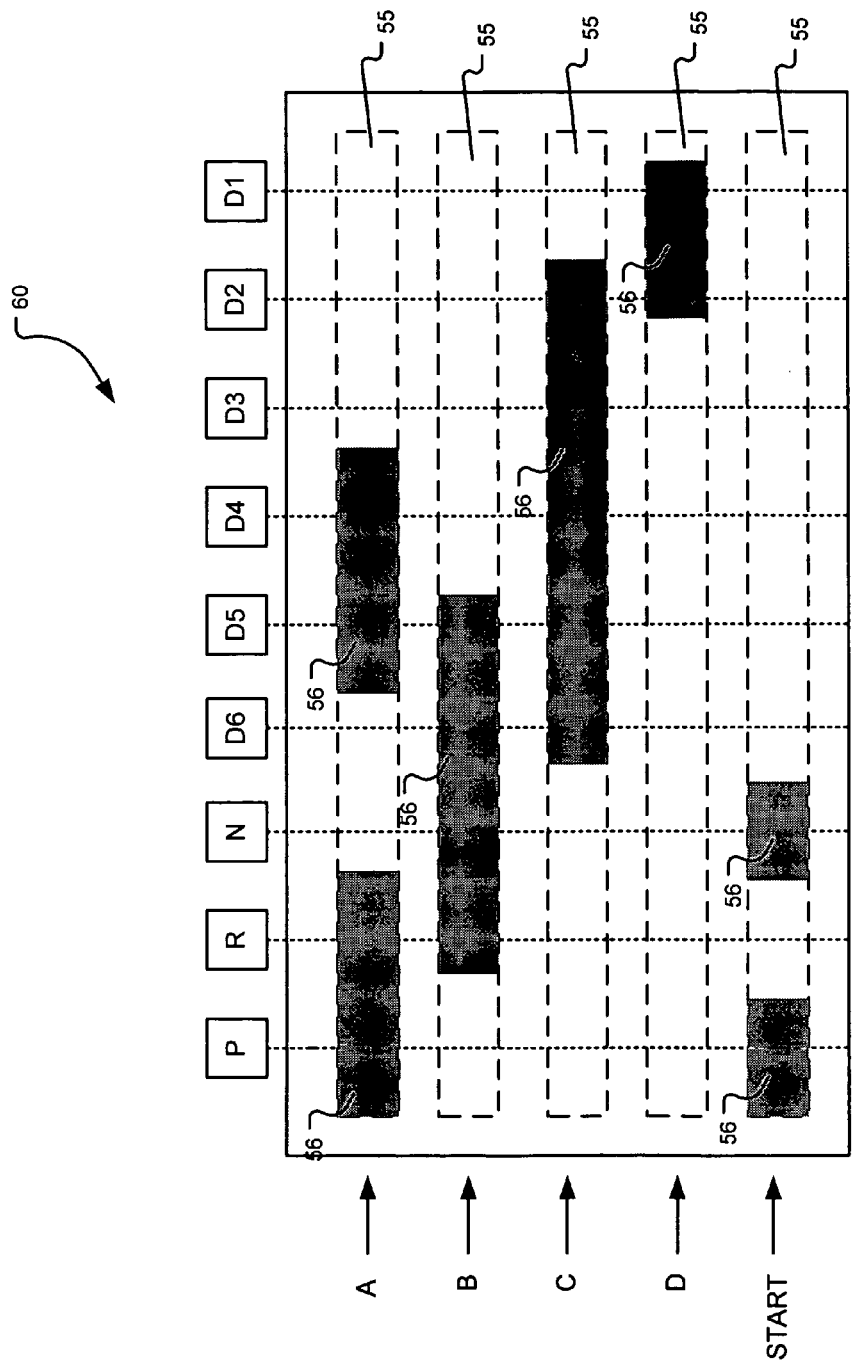
FIG. 5 is an exemplary track pattern for a dual wire IMS assembly according to the present disclosure.

Referring now to FIG. 5, an exemplary set of track patterns 60 for a six speed transmission is shown. Although the set of track patterns 60 is for a six speed transmission, a transmission with less than six speeds, or a transmission with more than six speeds may be used in alternate configurations. In other words, transmission ranges may include, and is not limited to P, R, N, D6, D5, D4, D3, D2, D1. The set of track patterns 60 includes five unique track patterns each corresponding to one of the tracks 55 (A, B, C, D, START). Although five tracks are included, it is also considered that less than five tracks, or more than five tracks may be used in alternate configurations.

Figure 6:
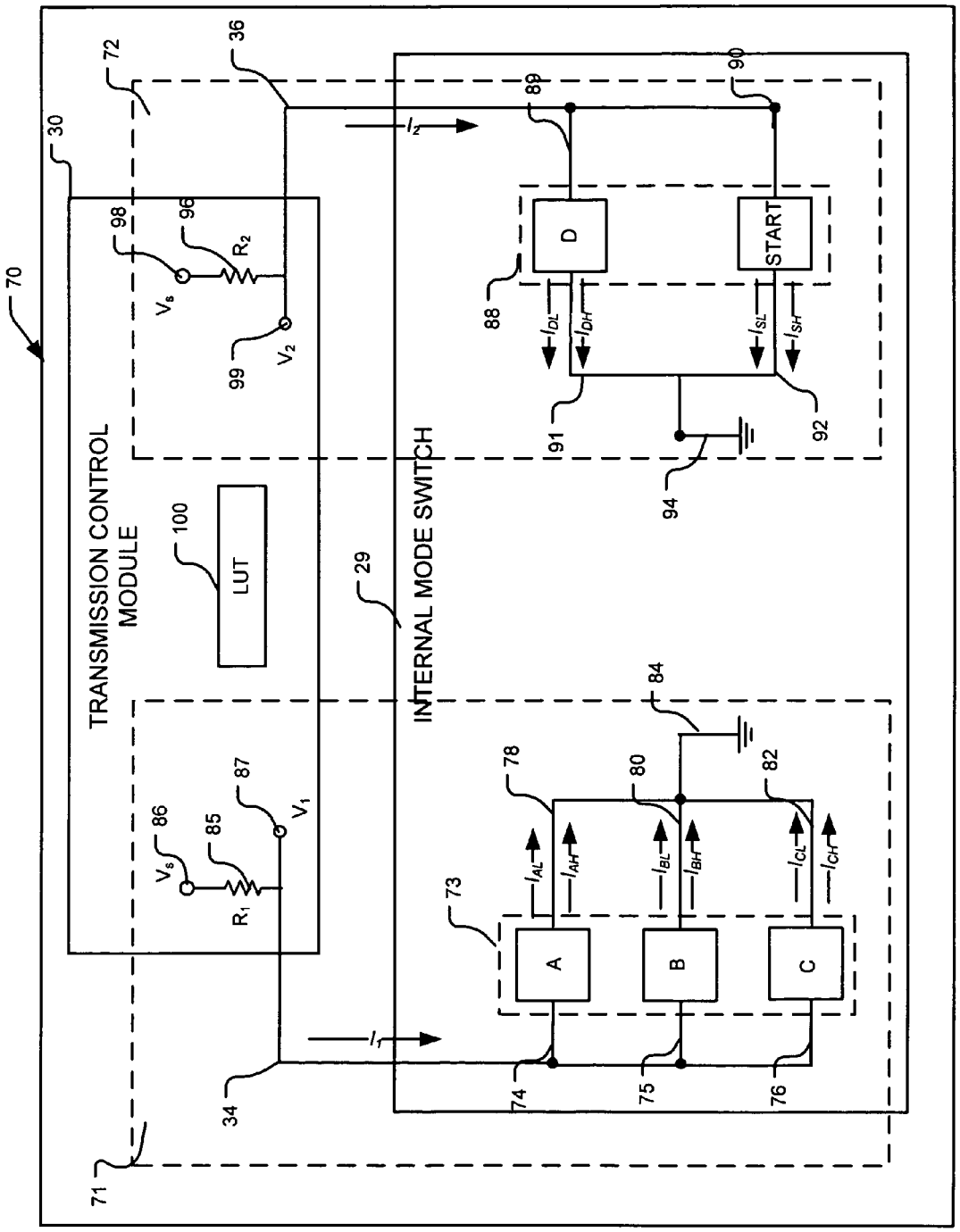
FIG. 6 is a schematic diagram of the dual wire IMS assembly in normal operation according to the present disclosure.

Referring now to FIG. 6, an electrical schematic 70 includes a first circuit 71 and a second circuit 72. The first circuit 71 includes a first set of Hall-effect switches (A, B, C) in a parallel connection. More specifically, one end of a first signal conductor 74 is connected to the Hall-effect switch A. One end of a second signal conductor 75 is connected to the Hall-effect switch B. One end of a third signal conductor 76 is connected to the Hall-effect switch C. The opposite ends of the first, second, and third signal conductors 74, 75, 76 respectively, are connected together and connect in series with the first connecting conductor 34.

One end of a first ground conductor 78 is connected to Hall-effect switch A. One end of a second ground conductor 80 is connected to one Hall-effect switch B. One end of a third ground conductor 82 is connected to Hall-effect switch C. The opposite ends of the first, second, and third ground conductors 78, 80, 82 respectively, are connected together and terminate at a first ground 84.

The first circuit 71 further includes a pull-up resistor 85 with a resistance value of $R_1$ (e.g., 63 Ohms) and a voltage supply 86 with a voltage value of $V_s$. The voltage supply 86 connects in series with one end of the pull-up resistor 85, and the opposite end of the pull-up resistor 85 connects in series with the first connecting conductor 34. The TCM 30 determines a first voltage ($V_1$) at 87.

The second circuit 72 includes a second set of Hall-effect switches 88 (D, START) in a parallel connection. More specifically, one end of a fourth signal conductor 89 is connected to Hall-effect switch D. One end of a fifth signal conductor 90 is connected to Hall-effect switch START. The opposite end of the fourth and fifth signal conductors 89, 90 respectively, are connected together and connect in series with the second connecting conductor 36.

One end of a fourth ground conductor 91 is connected to Hall-effect switch D. One end of a fifth ground conductor 92 is connected to Hall-effect switch START. The opposite ends of the first and second ground conductors 91, 92 respectively, are connected together and terminate at a second ground 94. Although, a first ground 84 and second ground 94 are shown, the first and second circuits 71, 72 respectively, may share a common ground.

The second circuit 72 further includes a pull-up resistor 96 with a resistance value of $R_2$ (e.g., 120 Ohms) and a voltage supply 98 with a voltage value of $V_s$. The voltage supplies 86, 98 can be a common voltage supply. The voltage supply 98 connects in series with one end of the pull-up resistor 96, and the opposite end of the pull-up resistor connects in series with the second connecting conductor 36. The TCM 30 determines a second voltage ($V_2$) at 99.

As discussed above, the first and second set of Hall-effect switches 73, 88 (A, B, C, D, START) can induce two constant levels of current based on the presence of the ferrous material 56. More specifically, each Hall-effect switch has its own unique high level current relative to its corresponding set. This characteristic enables the first circuit 71 and the second circuit 72 to produce a unique pair of voltages at 87 and 99 for every selected range. Therefore, the TCM 30 may identify the selected range by using a lookup table (LUT) 100 that contains a predetermined set of values of $V_1$ and $V_2$ for each selected range.

For example, if D5 is selected, then based on the exemplary track pattern 60 in FIG. 5 and FIGS. 3A and 3B, the first set of Hall-effect switches 73 (A, B, C) will be in the presence of ferrous material. Therefore, the Hall-effect switch A will induce a constant unique high level current ($I_{AH}$), the Hall-effect switch B will induce a constant unique high level current ($I_{BH}$), and the Hall-effect switch C will induce a constant unique high level current ($I_{CH}$). Since, the first set of Hall-effect switches 73 are in parallel, the current induced by each Hall-effect switch (A, B, C) will add together. The sum of induced currents is the total current ($I_1$) through the first connecting conductor 34, and may be based on the following equation:

$$I_1 = I_{AH} + I_{BH} + I_{CH}$$

The TCM 30 may determine the first voltage ($V_1$) at 87 based on the following equation:

$$V_1 = V_s - (I_1 \times R_1)$$

The second set of Hall-effect switches 88 (D, START), based on the exemplary track pattern 60 in FIG. 5 and FIGS. 3A and 3B, will not be in the presence of a ferrous material. Therefore, the Hall-effect switch D will induce a constant low level current ($I_{DL}$) and the Hall-effect switch START will induce a constant low level current ($I_{SL}$). Since the second set of Hall-effect switches 88 are in parallel, the currents induced by each Hall-effect switch (D, START) will add together. The sum of induced currents is the total current ($I_2$) through the second connecting conductor 36, and may be based on the following equation:

$$I_2 = I_{DL} + I_{SL}$$

The TCM 30 may determine the second voltage ($V_2$) at 99 based on the following equation:

$$V_2 = V_s - (I_2 \times R_2)$$

When the values of $V_1$ and $V_2$ are determined, the TCM 30 may compare values of $V_1$ and $V_2$ to predetermined values in the lookup table 100 to identify the selected range.

Figure 7:
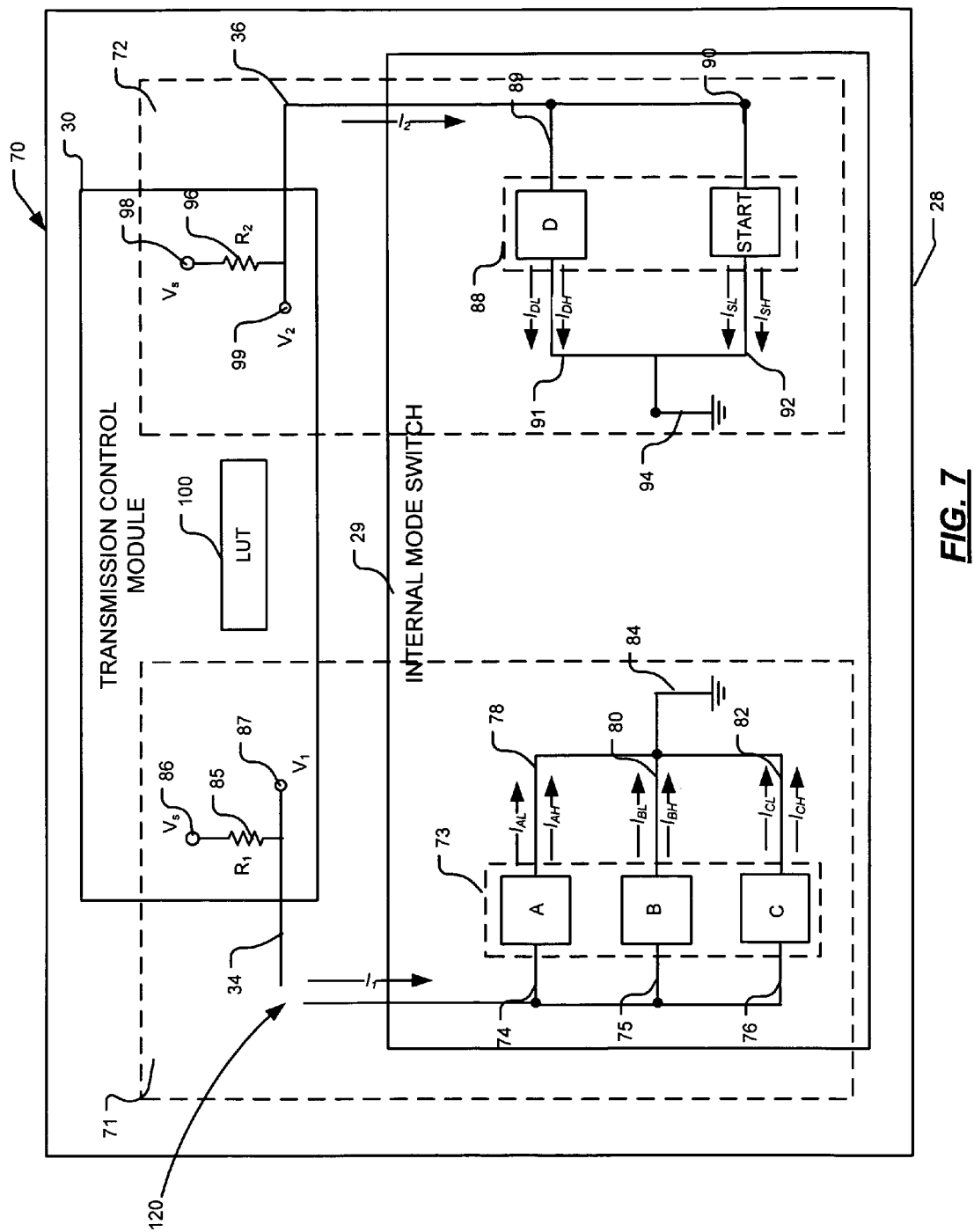
FIG. 7 is a schematic diagram of the dual wire IMS assembly including an open-circuit fault according to the present disclosure.

Referring now to FIG. 7, an open-circuit fault 120 is shown according to an exemplary embodiment of the present disclosure. The first connecting conductor 34 is disconnected therefore, interrupting current flow through the circuit. Since there is no current ($I_1$) through the resistor 85, there is no voltage drop across the resistor 85. Therefore, $V_1$ is equal to $V_s$. The TCM 30 may identify the open-circuit fault 120 when $V_1$ and/or $V_2$ are equal to $V_s$. More specifically, the TCM 30 may identify the location of the open-circuit fault 120. If $V_2$ equals $V_s$, then the open-circuit fault 120 is located in the second circuit 72. Similarly, if $V_1$ equals $V_s$, then the open-circuit fault is located in the first circuit 71.

Figure 8:
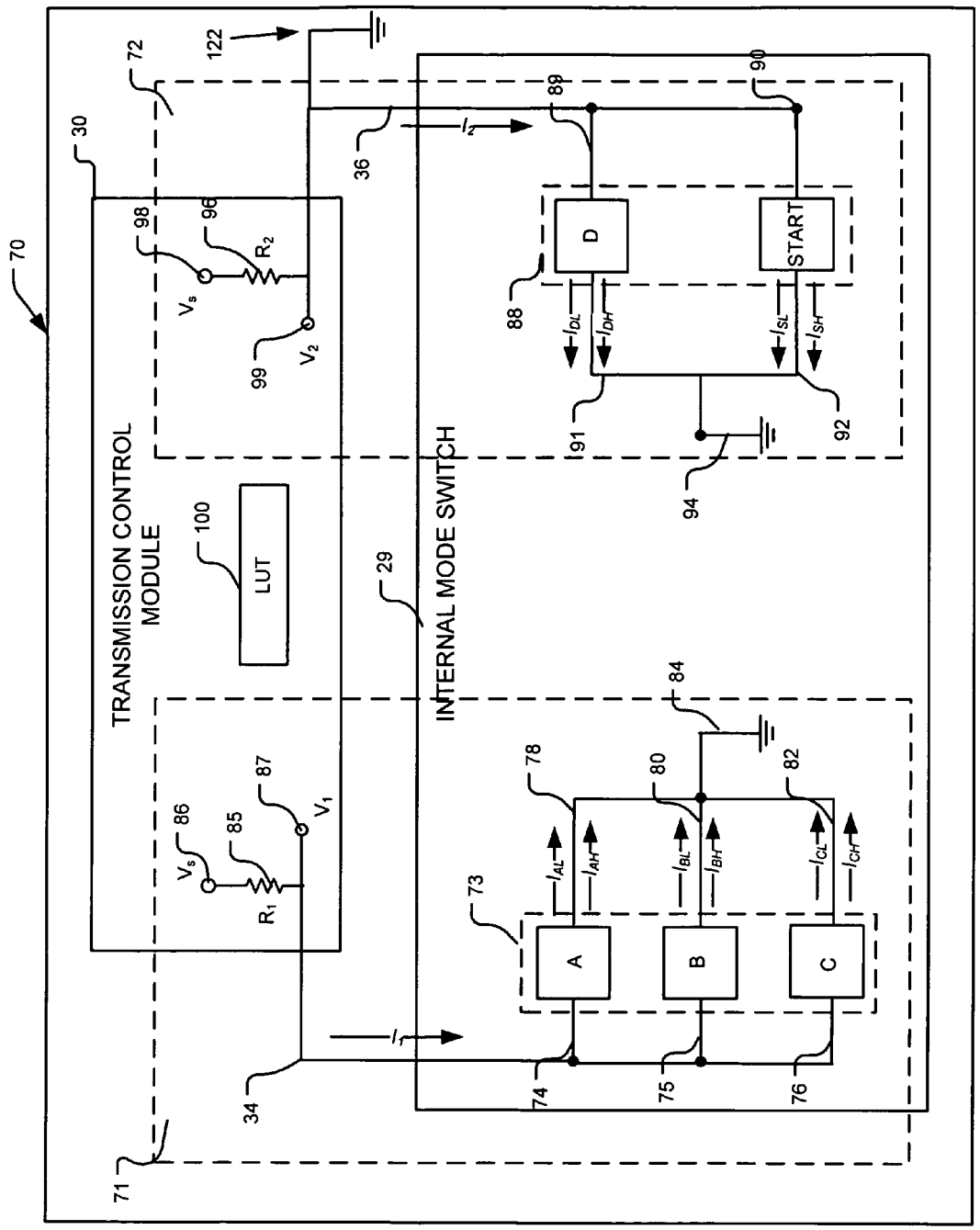
FIG. 8 is a schematic diagram of the dual wire IMS assembly including a short-circuit fault according to the present disclosure.

Referring now to FIG. 8, a short-circuit fault 122 is shown according to an exemplary embodiment of the present disclosure. The second connecting conductor 36 is shorted, and current ($I_2$) is directed to ground after passing through the resistor 96. For example, the short-circuit fault may occur when a foreign conducting material that is connected to a ground comes in direct contact with the second connecting conductor 36. Since all of $V_s$ is dropped across the resistor 96, there is no voltage drop across the second set of Hall-effect switches. Therefore, the value for $V_2$ is equal to 0. The TCM 30 may identify the short-circuit fault 122 when $V_1$ and/or $V_2$ is equal to 0. More specifically, the TCM 30 may identify the location of the short-circuit fault 122. If $V_2$ equals 0, then the short-circuit fault 122 is located in the second circuit 72. Similarly, if $V_1$ equals 0, then the short-circuit fault 122 is located in the first circuit 71.

Figure 9:
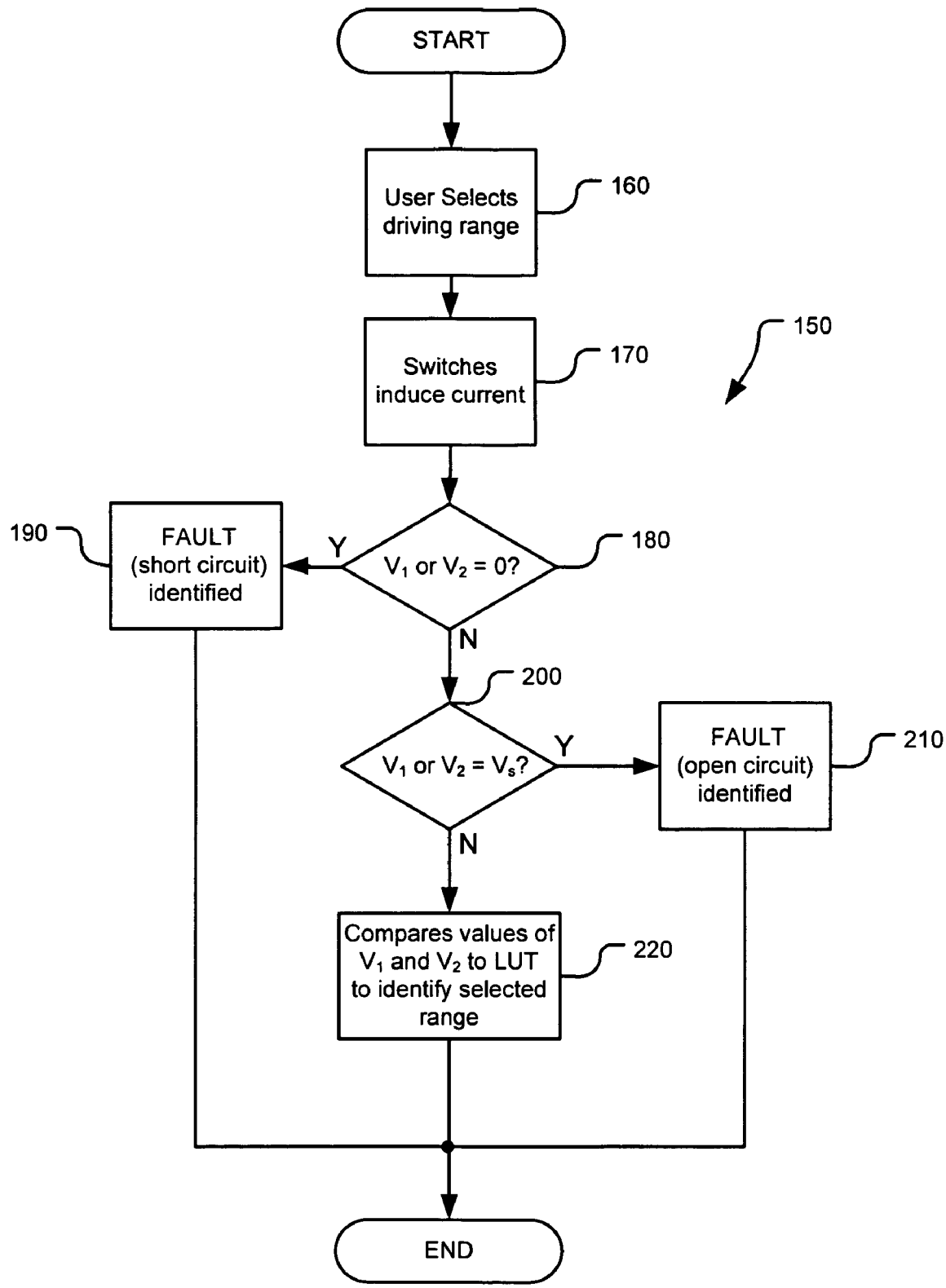
FIG. 9 is an exemplary flowchart illustrating steps for a transmission control system to identify the selected transmission range.

Referring now to FIG. 9, a flowchart 150 illustrates exemplary steps for the TCM 30 to identify the selected transmission range. In step 160, a transmission range is selected. In step 170, the Hall-effect switches 52 induce a current. More specifically, the Hall-effect switches 52 induce a current based on the presence or absence of a ferrous material. In step 180, control determines if $V_1$ and/or $V_2$ is equal to zero. If $V_1$ and/or $V_2$ is equal to zero control identifies the short-circuit fault 122 in step 190, and control terminates. If $V_1$ and $V_2$ are not equal to zero, control proceeds to determine if $V_1$ and/or $V_2$ is equal to Vs in step 200. If $V_1$ and/or $V_2$ are equal to $V_s$, control identifies the open-circuit fault 120 in step 210. If $V_1$ and $V_2$ are not equal to $V_s$, control proceeds to compare $V_1$ and $V_2$ to corresponding values in the LUT 100 to identify the selected range in step 220.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A range selection system for a vehicle including an automatic transmission having an internal mode switch (IMS) assembly, comprising:
    a housing that is rotatable around a core;
    a first set of switches that induce a first current based on a rotational position of said housing;
    a second set of switches that induce a second current based on said rotational position of said housing; and
    a control module that determines first and second voltages based on said first and second currents, respectively, and that identifies a range of said automatic transmission based on said first and second voltages.

2. The range selection system of claim 1 wherein said first and second sets of switches are connected in parallel.

3. The range selection system of claim 1 wherein said first and second sets of switches comprise Hall-effect switches.

4. The range selection system of claim 1 wherein each of said switches of said first and second sets of switches induces one of a high current and a low current based on said rotational position of said housing.

5. The range selection system of claim 1 further comprising a plurality of ferrous tracks embedded in said housing.

6. The range selection system of claim 5 wherein each of a plurality of rotational positions of said housing includes a unique alignment of at least a portion of said plurality of ferrous tracks with at least a portion of said switches of said first and second plurality of switches.

7. The range selection system of claim 6 wherein a particular switch of said first and second sets of switches induces a high current when aligned with one of said plurality of ferrous tracks and induces a low current when not aligned with one of said plurality of ferrous tracks.

8. The range selection system of claim 4 wherein said high and low currents corresponding to said first set of switches are different than said high and low currents corresponding to said second set of switches.

9. The range selection system of claim 1 further comprising:
    a voltage source;
    a first resistor; and
    a second resistor,
    wherein said first resistor is in electrical communication with said voltage source and said first set of switches and said second resistor is in electrical communication with said voltage source and said second set of switches.

10. The range selection system of claim 9 wherein said first voltage is determined as a first voltage drop across said first resistor and said second voltage is determine as a second voltage drop across said second resistor.

11. The range selection system of claim 1 wherein said control module identifies a fault when at least one of said first and second voltages is equal to zero.

12. The range selection system of claim 1 wherein said control module identifies a fault when at least one of said first and second voltages is equal to a voltage of a voltage source that is in electrical communication with each of said first and second sets of switches.

\* \* \* \* \*